(12) United States Patent
Anderson

(10) Patent No.: US 12,188,591 B2
(45) Date of Patent: Jan. 7, 2025

(54) PIPE SUPPORT CLAMP

(71) Applicant: ERICO International Corporation, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/189,568

(22) Filed: Mar. 24, 2023

(65) Prior Publication Data

US 2023/0304607 A1 Sep. 28, 2023

Related U.S. Application Data

(60) Provisional application No. 63/323,767, filed on Mar. 25, 2022.

(51) Int. Cl.
| | | |
|---|---|---|
| *F16L 3/10* | (2006.01) | |
| *F16L 59/02* | (2006.01) | |
| *F16L 59/18* | (2006.01) | |

(52) U.S. Cl.
CPC ........... *F16L 3/1091* (2013.01); *F16L 59/021* (2013.01); *F16L 59/184* (2013.01)

(58) Field of Classification Search
CPC . F16L 3/1091; F16L 3/24; F16L 3/243; F16L 3/2431; F16L 3/245; F16L 59/021; F16L 59/135; F16L 59/184; F16L 3/1016; F16L 3/10; F16L 5/00
USPC ........................................................ 248/74.4
See application file for complete search history.

(56) References Cited

U.S. PATENT DOCUMENTS

| | | | | |
|---|---|---|---|---|
| 863,887 | A * | 8/1907 | Stuttle | F16L 21/06 285/373 |
| 3,185,758 | A * | 5/1965 | Litz | F16L 59/135 248/62 |
| 4,122,298 | A | 10/1978 | Brandt | |
| 4,804,158 | A * | 2/1989 | Collins | F16L 59/135 248/74.4 |
| 5,007,666 | A | 4/1991 | Kyfes | |

(Continued)

FOREIGN PATENT DOCUMENTS

| | | |
|---|---|---|
| CN | 201487396 U | 5/2010 |
| CN | 206874967 | 1/2018 |

(Continued)

*Primary Examiner* — Nkeisha Smith
(74) *Attorney, Agent, or Firm* — Quarles & Brady LLP

(57) ABSTRACT

A support clamp is provided for supporting an elongate object. The support clamp can include a clamp body that forms a cylindrical sleeve and a collar that extends radially inwardly from the cylindrical sleeve to provide an internal passageway sized to receive the elongate object. The clamp body can include first and second clamp sections that can each have, respectively, a sleeve wall that forms part of the cylindrical sleeve and a collar wall that forms part of the collar and includes an edge that extends radially between the sleeve wall and the internal passage. The edge of the first clamp section can include a channel profile, and the edge of the second clamp section can include a protruding profile. The protruding profile can be received into the channel profile to removably secure the first and second clamp sections together.

17 Claims, 13 Drawing Sheets

(56) References Cited

U.S. PATENT DOCUMENTS

| | | | |
|---|---|---|---|
| 5,013,166 A * | 5/1991 | Domer | B60G 21/0551 384/220 |
| 5,192,039 A | 3/1993 | Williams | |
| 5,215,281 A | 6/1993 | Sherman | |
| 5,381,833 A | 1/1995 | Cummings et al. | |
| D408,727 S | 4/1999 | Sherman | |
| 6,105,216 A | 8/2000 | Opperthauser | |
| 6,105,907 A | 8/2000 | Komsitsky | |
| 6,138,960 A | 10/2000 | Carbonare et al. | |
| 6,315,006 B1 | 11/2001 | Opperthauser | |
| 7,150,439 B2 | 12/2006 | Konold | |
| 7,207,527 B2 | 4/2007 | Opperthauser | |
| 7,322,380 B2 | 1/2008 | Opperthauser | |
| 7,520,475 B2 * | 4/2009 | Opperthauser | F16L 3/1211 248/74.1 |
| 7,793,893 B2 | 9/2010 | Opperthauser | |
| 8,262,308 B2 * | 9/2012 | Peng | F16B 5/0635 285/39 |
| 9,512,824 B2 | 12/2016 | Brabander et al. | |
| 9,903,512 B2 * | 2/2018 | Sixsmith | F16L 3/133 |
| 10,156,254 B2 | 12/2018 | Bhosale et al. | |
| 10,627,040 B1 | 4/2020 | Flynn | |
| 10,761,285 B2 | 9/2020 | Courchaine et al. | |
| 10,900,594 B2 | 1/2021 | Weatherby et al. | |
| 10,914,405 B2 * | 2/2021 | Dodge | F16L 3/1016 |
| 10,989,270 B2 | 4/2021 | Minola | |
| 11,060,637 B2 * | 7/2021 | Takeda | F16L 47/145 |
| 11,104,095 B2 | 8/2021 | Milne et al. | |
| 11,299,007 B2 * | 4/2022 | Sakaguchi | B60H 1/00 |
| 11,346,491 B2 | 5/2022 | Lopez | |
| 11,384,865 B2 | 7/2022 | Meola et al. | |
| 11,402,597 B2 | 8/2022 | Courchaine et al. | |
| 11,460,213 B2 | 10/2022 | Lopez | |
| 11,462,897 B2 | 10/2022 | Marchek et al. | |
| 11,692,664 B2 * | 7/2023 | Dodge | F16L 59/135 138/107 |
| 2009/0178723 A1 | 7/2009 | Cioffi | |
| 2010/0181439 A1 | 7/2010 | Korff | |
| 2011/0303456 A1 | 12/2011 | Blanchard et al. | |
| 2014/0097304 A1 | 4/2014 | Mastro | |
| 2018/0238473 A1 | 8/2018 | Meola et al. | |
| 2019/0226613 A1 | 7/2019 | Schneider et al. | |
| 2020/0379201 A1 | 12/2020 | Courchaine et al. | |
| 2021/0180739 A1 | 6/2021 | Dodge et al. | |
| 2021/0222800 A1 * | 7/2021 | Koenig | F16L 57/06 |
| 2022/0090704 A1 | 3/2022 | Harris et al. | |
| 2022/0131358 A1 | 4/2022 | Marchek et al. | |
| 2022/0146038 A1 | 5/2022 | Dodge et al. | |
| 2022/0326465 A1 | 10/2022 | Courchaine et al. | |

FOREIGN PATENT DOCUMENTS

| | | |
|---|---|---|
| CN | 208474653 | 2/2019 |
| CN | 106641463 B | 5/2019 |
| CN | 208816861 | 5/2019 |
| EP | 503566 | 9/1995 |
| EP | 3290764 | 6/2019 |
| GB | 2168775 | 7/1988 |
| GB | 2539595 | 6/2018 |
| JP | 2021-124191 | 8/2021 |

* cited by examiner

PIPE SUPPORT CLAMP

CROSS-REFERENCE TO RELATED APPLICATIONS

This application claims priority to and incorporates by reference U.S. Provisional Application No. 63/323,767, filed Mar. 25, 2022, titled "Pipe Support Clamp," and is incorporated herein by reference in its entirety.

BACKGROUND

In many applications, it may be useful to insulate a pipe (e.g., plumbing pipes) installed throughout residential, commercial, and/or industrial buildings to aid in reducing heat transfer to or from the pipe to the ambient air. In some cases, pipes are supported by a clamp from a supporting member (e.g., a wall structure, ceiling, or strut channel), and according to some construction standards, the insulation must be continuous even in places the pipes are supported by a clamp.

SUMMARY

Some embodiments of the invention provide a support clamp for supporting an elongate object that extends along an axial direction. The support clamp can include a clamp body that forms a cylindrical sleeve and a collar that extends radially inwardly from the cylindrical sleeve to provide an internal passageway sized to receive the elongate object. The clamp body can include first and second clamp sections that can each have, respectively, a sleeve wall that forms part of the cylindrical sleeve and a collar wall that forms part of the collar and includes an edge that extends radially between the sleeve wall and the internal passage. The edge of the first clamp section can include a channel profile, and the edge of the second clamp section can include a protruding profile. The protruding profile can be received into the channel profile to removably secure the first and second clamp sections together.

Some embodiments provide a support clamp for supporting an elongate object that extends along an axial direction. The support clamp can include a set of clamp sections, including a first clamp section and a second clamp section. The first and second clamp sections can each have, respectively, a sleeve wall that defines an inner peripheral surface and a collar wall that extends from the inner peripheral surface of the sleeve wall to define an inner arcuate profile, opposing contact surfaces extending between the inner peripheral surface and the inner arcuate profile, and an edge that extends between the inner peripheral surface and the inner arcuate profile. The edge of the first clamp section can include a first engagement profile. The edge of the second clamp section can include a second engagement profile. The first engagement profile can engage the second engagement profile to removably secure the first and second clamp sections together with the inner arcuate profiles defining an internal passageway to receive the elongate object.

Some embodiments provide a method of installing a pipe. The method can include securing a pipe within an internal passageway of a clamp body that is formed from first and second clamp sections, with the clamp body in a closed configuration, so that that pipe is surrounded by a cylindrical sleeve that is formed by a respective sleeve wall of each of the first and second clamp sections and supported by a collar that is formed by a respective collar wall of each of the first and second clamp sections and extends radially from the cylindrical sleeve to provide the internal passageway. Placing the clamp body in the closed configuration can include removably securing the first and second clamp sections together with a protruding profile along the collar wall of the first clamp section received within a channel profile along the collar wall of the second clamp section.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
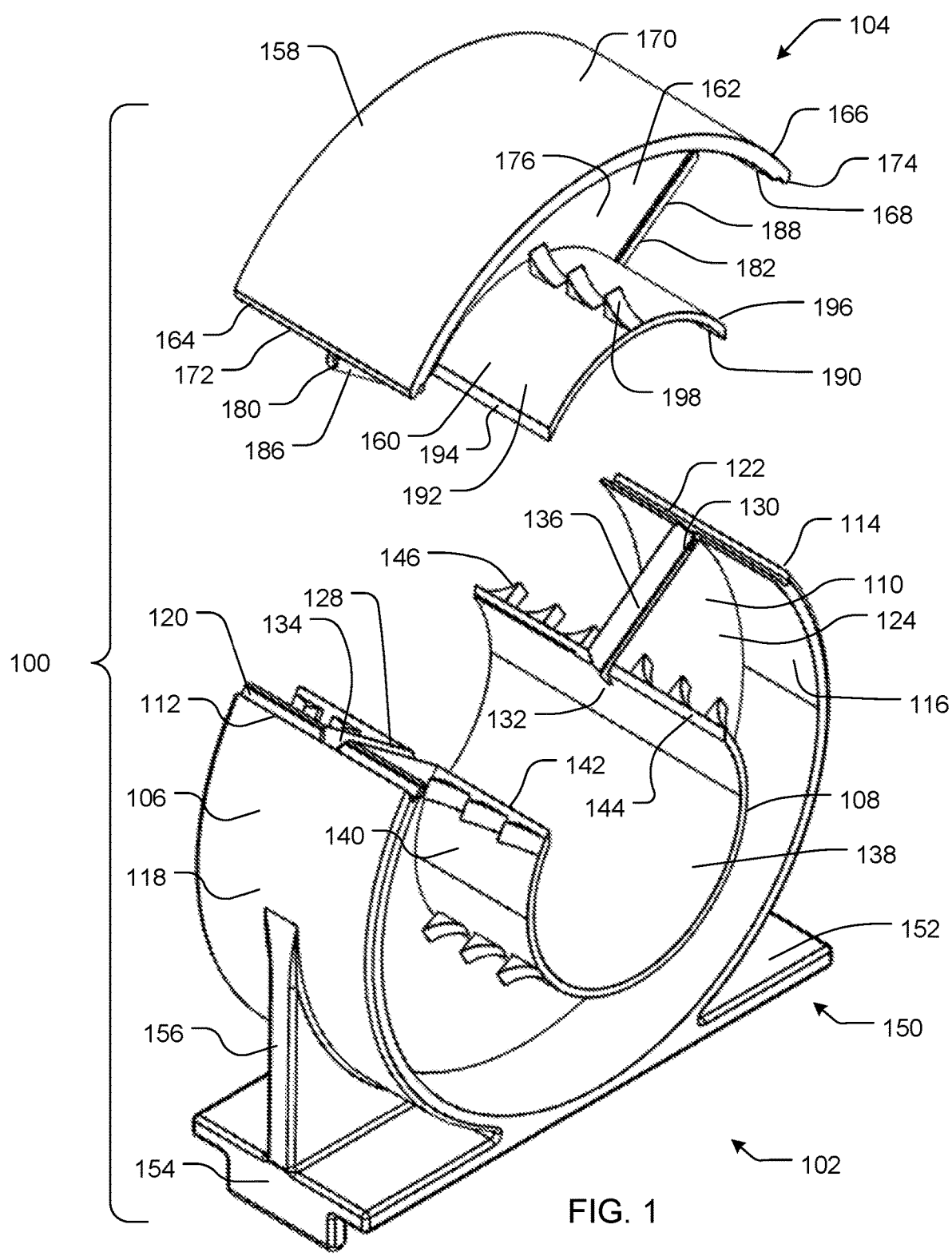
FIG. 1 is a front top left isometric view of a mounting clamp in an open configuration according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical direction for a relevant reference frame.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to secure mechanical components (e.g., pipes or other fluid conduits) to support members (e.g., strut channels or structural members of a structure) and to accommodate insulation installed around the mechanical components. Embodiments of the invention can be useful for this purpose, and others. For example, embodiments of the invention can be used to secure a plumbing pipe, gas line, or other mechanical component on a strut channel or in a clevis hanger and is configured to accommodate insulation installed around the mechanical component to provide continuous coverage thereof.

In some embodiments, a mounting clamp can include a first clamp section coupled to a second clamp section that are moveable between an open configuration and a closed configuration. In some configurations, the mounting clamp can support an elongate object (e.g., a plumbing pipe) from a supporting device (e.g., a strut channel or straddle clevis hanger). In some configurations the pipe can be insulated with a pipe insulation and the mounting clamp can provide a contacting surface (e.g., a collar wall) against which the pipe insulation can contact on both sides to provide an unbroken insulative covering around and along the pipe. In some configurations, the mounting clamp can have a sleeve wall that extends from the collar wall configured to be received within the pipe insulation. In some configurations, the sleeve wall can have features configured to engage the pipe insulation to ensure the pipe insulation is retained on the mounting clamp and against the collar wall. For example, projecting teeth can be formed to extend radially outward from the sleeve wall to engage the inner surface of the pipe insulation.

In some conventional arrangements, a mounting clamp that is configured to attach an insulated pipe to a structure will retain the pipe insulation by compressing the outer periphery of the insulation. In such an arrangement, various mounting clamps are required for each size of piping for each potential piping insulation thickness (e.g., ⅜", ½", ¾", 1", 1¼", 1½", 2", etc.). Therefore, in the field, an installer will be required to know what the pipe diameter and insulation size to install the correct mounting clamp. Further, a parts distributor will need to have inventory for all the different sizes of mounting clamps.

Some embodiments of the invention can address this issue, or others. For example, some embodiments of the invention are presented below in the context of mounting clamps for piping and pipe insulation, wherein the mounting clamps are configured to fit a predetermined pipe size but can retain a range of insulation sizes (e.g., ⅜", ½", ¾", 1", 1¼", 1½", 2", etc.). Generally, however, the principles disclosed herein can be used with any variety of mounting clamps and can be used to secure any variety of components in place.

FIGS. 1 through 10 illustrate an embodiment of a mounting clamp 100 configured to be mounted to a supporting device (for example, the strut channel 80 shown in FIG. 13) or a straddle clevis hanger (not shown)). The mounting clamp 100 can generally be formed as a multi-piece clamp body that includes a set of clamp sections. For example, a two-piece clamp body can include a first clamp section 102 and a second clamp section 104. The first and second clamp sections 102, 104 are shown as independent elements configured to be coupled together. However, it is contemplated that the first and second clamp sections 102, 104 can be hingedly coupled, for example, by a living hinge (not shown). In such an embodiment, the first and second clamp sections 102, 104 may comprise an integrally formed clamp.

Continuing with the mounting clamp 100, the first clamp section 102 is shown including a first sleeve wall 106, a second sleeve wall 108, and a collar wall 110. As shown, the first sleeve wall 106 and the second sleeve wall 108 are partially cylindrical and spaced coaxially, with the second sleeve wall 108 positioned internally relative to the first sleeve wall 106. The first sleeve wall 106 extends between a first end 112 and a second end 114 and has an inner peripheral surface 116 and an outer peripheral surface 118. The first end 112 includes a first end mating feature 120 (e.g., shown in FIGS. 1 and 2 as a slot and protrusion extending along the first end 112) and the second end 114 has second end mating feature 122, similar to the first end mating feature 120, extending along the second end 114.

The collar wall 110 extends inwardly and perpendicularly from the first sleeve wall 106. As shown, the collar wall 110 is substantially planar and defines a front contact surface 124, a rear contact surface 126 opposite the front contact surface 124, a first radial edge 128, a second radial edge 130, and an inner arcuate profile 132 extending between the first and second radial edges 128, 130.

Generally, a collar wall of a clamp section can include engagement profiles that extend between a corresponding outer sleeve wall and inner arcuate profile (e.g., extending radially along an edge of the collar wall). In particular, engagement profiles on corresponding first and second clamp sections can be configured to engage each other, to thereby secure the clamp sections together via a connection along the collar wall. For example, as shown in FIGS. 1 through 10, the first and second radial edges 128, 130 can further include engagement profiles formed as first and second channel profiles 134, 136, extending therealong, respectively. As shown, for example, the first and second channel profiles 134, 136 can be one half of a snap lock feature. Additionally, the first and second radial edges 128, 130, at points adjacent the inner arcuate profile 132, define an opening 148 with an opening distance D1 between circumferential ends thereof.

Further, the second sleeve wall 108 extends in opposite directions from the front contact surface 124 and the rear contact surface 126 of the collar wall 110. The second sleeve wall 108 has an inner peripheral surface 138, an outer peripheral surface 140, a first end 142, and a second end 144. The inner peripheral surface 138 of the second sleeve wall 108 effectively extends the inner arcuate profile 132 of the collar wall 110. As shown, the second sleeve wall 108 also includes a plurality of teeth 146 extending in rows, radially spaced along the outer peripheral surface 140. Here, specifically, the plurality of teeth 146 is shown including five rows of three teeth spaced around the outer peripheral surface 140. However, other arrangements including more or fewer rows and/or more or fewer teeth are contemplated. Additionally, the first and second ends 142, 144 of the second sleeve wall 108 extend the opening 148.

Figure 12:
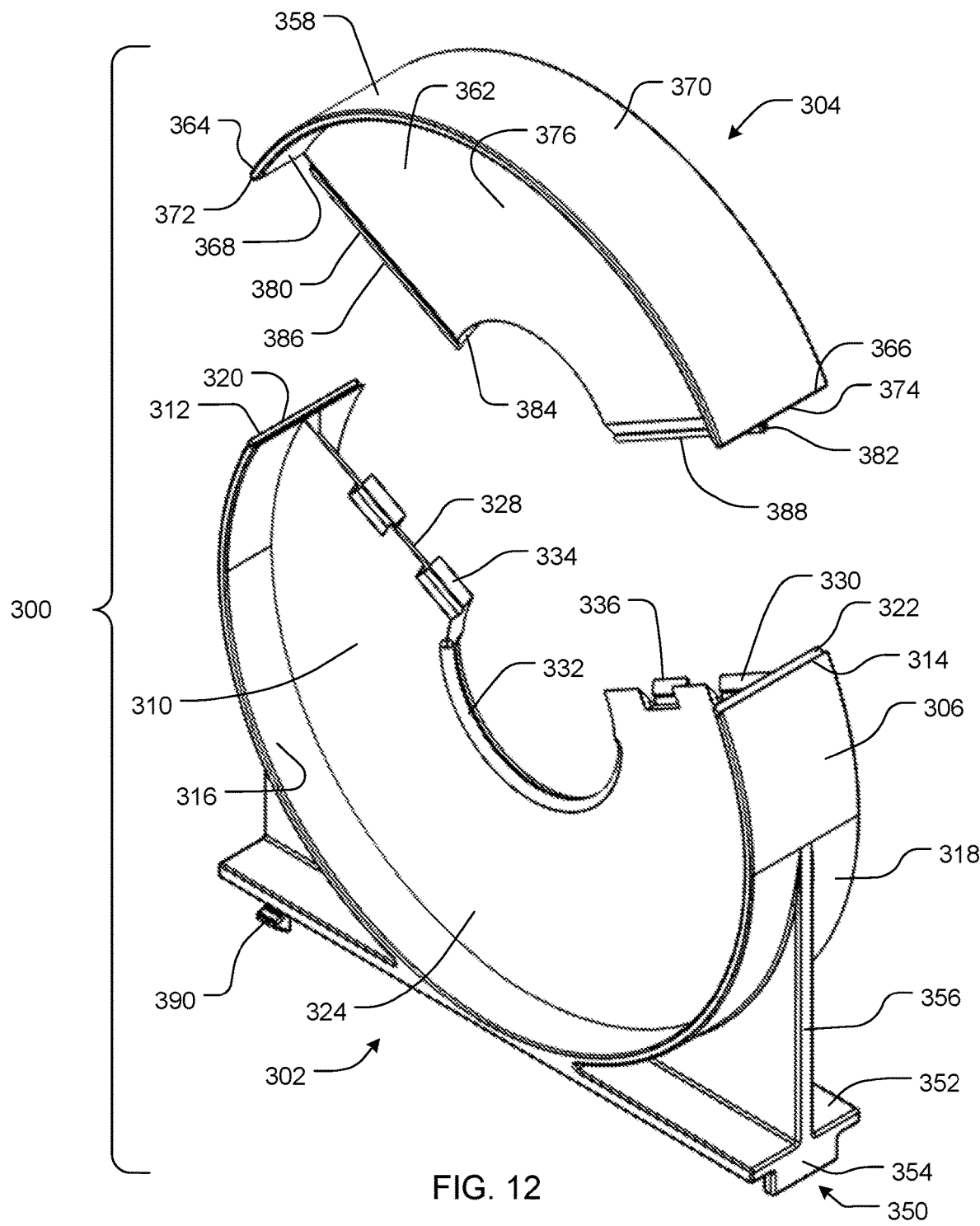
FIG. 12 is a front top right isometric view of a mounting clamp in an open configuration according to another embodiment of the invention.

Additionally, the first clamp section 102 can include a mounting feature, here shown as base 150, configured to aid in coupling the mounting clamp 100 on a supporting device (for example, a struct channel 80 as shown in FIG. 12). The base 150 has a platform 152 and a set of feet 154 extending from the platform 152, away from the first sleeve wall 106. The base 150 is sized and configured to be set over an opening in the strut channel 80 and the set of feet 154 are sized to fit within the opening 82 and between reentrant lips 84 of the strut channel 80. The base 150 is coupled to the outer peripheral surface 118 of the first sleeve wall 106 with a set of gussets 156. As shown, the base 150, the set of gussets 156, and the first sleeve wall 106 can be integrally formed.

Figure 2:
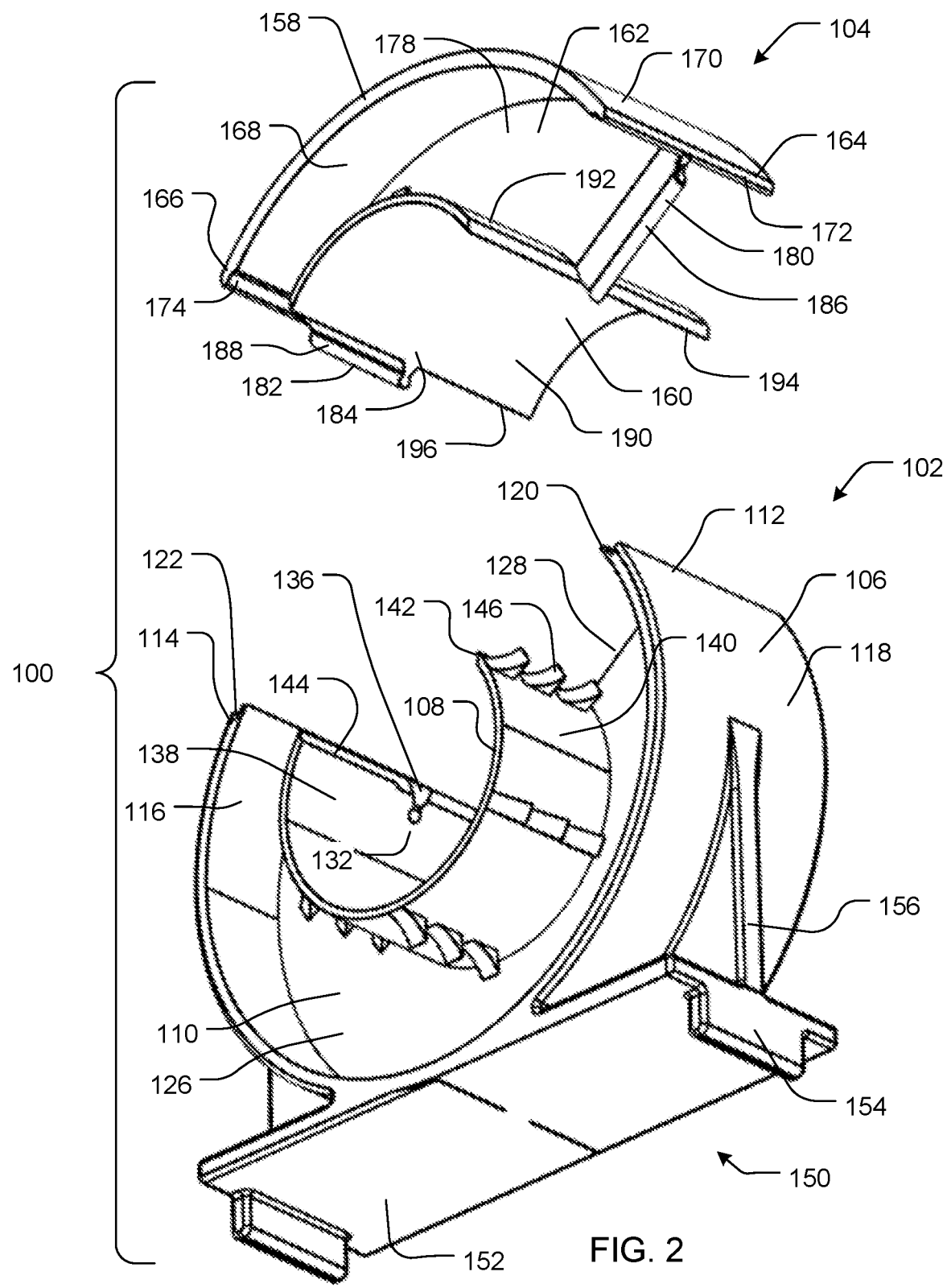
FIG. 2 is a rear bottom left isometric view of the mounting clamp of FIG. 1 in the open configuration.
Figure 3:
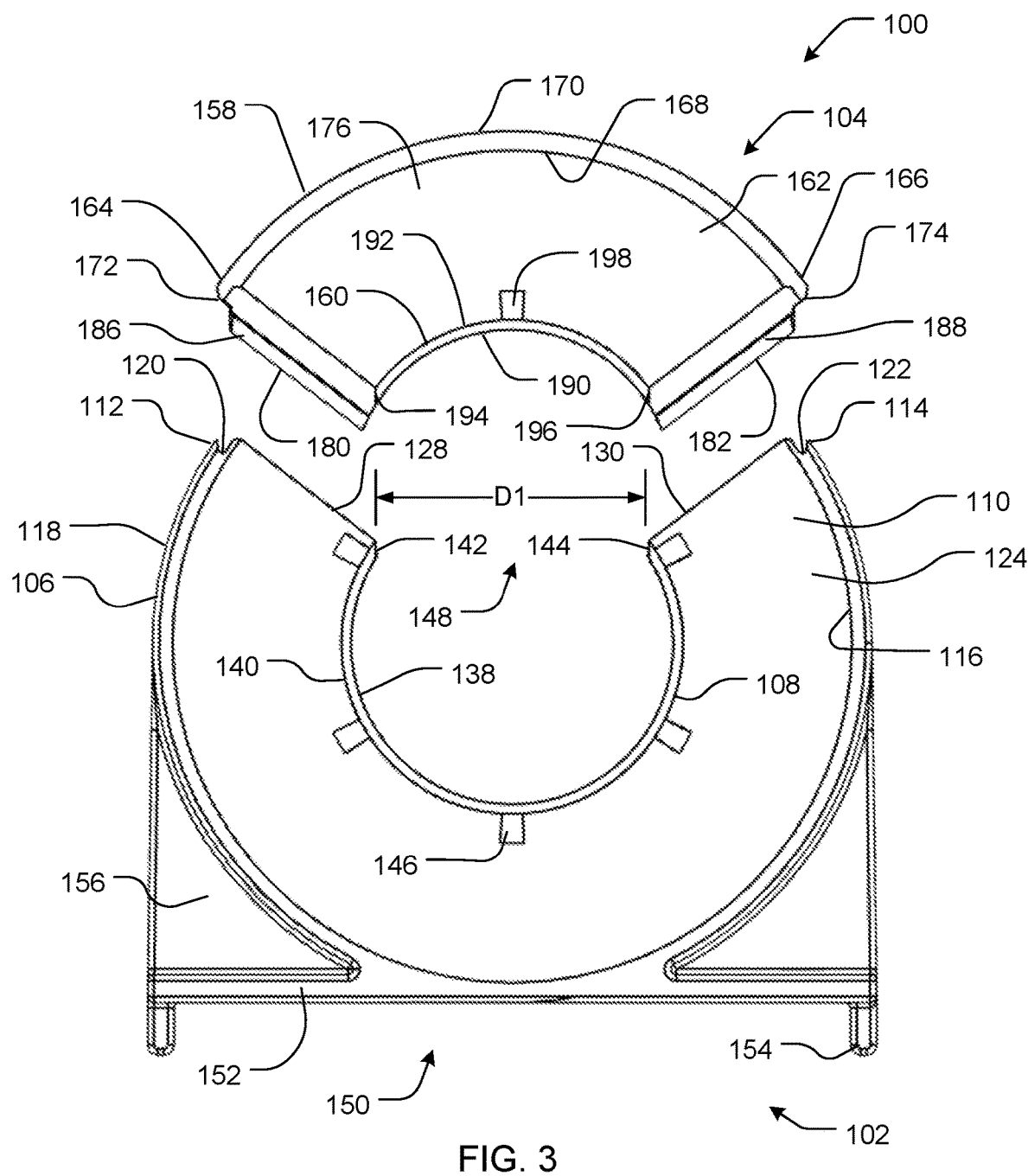
FIG. 3 is a front elevation view of the mounting clamp of FIG. 1 in the open configuration.

Continuing looking at FIGS. 1 through 10, the second clamp section 104 is shown. The second clamp section 104 is configured similarly to the first clamp section 102. The second clamp section 104 has a first sleeve wall 158, a second sleeve wall 160, and a collar wall 162. Similarly, the first sleeve wall 158 and the second sleeve wall 160 are partially cylindrical and spaced coaxially, with the second sleeve wall 160 positioned internally relative to the first sleeve wall 158. The first sleeve wall 158 extends between a first end 164 and a second end 166 and has an inner peripheral surface 168 and an outer peripheral surface 170. The first end 164 includes a first end mating feature 172 (e.g., as shown in FIGS. 1 and 2 as a slot and a protrusion extending along the first end 164) and the second end 166 has second end mating feature 174, similar to the first end mating feature 172, extending along the second end 166.

Additionally, the collar wall 162 of the second clamp section 104 extends inwardly and perpendicularly from the first sleeve wall 158. Similarly, the collar wall 162 is substantially planar and defines a front contact surface 176, a rear contact surface 178 opposite the front contact surface 176, a first radial edge 180, a second radial edge 182, and an inner arcuate profile 184 extending between the first and second radial edges 180, 182. The first and second radial edges 180, 182 further include respective second engagement profiles formed as first and second protruding profiles 186, 188, extending therealong, respectively. For example, the first and second protruding profiles 186, 188 of the second engagement profile can be defined by tabs, as shown, that extend along at least a majority of a radial distance, along the first and second radial edges 180, 182, respectively, between the inner peripheral surface 168 and the inner arcuate profile 184. The first and second protruding profiles 186, 188 are configured to removably engage in snap-fit manner with the first and second channel profiles 134, 136 of the first clamp section 102, as discussed further below. It is contemplated, however, that the first engagement profile of the first and second radial edges 128, 130 of the first clamp section 102 can comprise first and second protruding profiles and the second engagement profile of the first and second radial edges 180, 182 of the second clamp section 104 can comprise first and second channel profiles. It is further contemplated that in some embodiments, the first and second engagement profiles can comprise combinations of protruding profiles and channel profiles. For example, the first radial edge 128 of the first clamp section 102 can comprise a protruding profile and the second radial edge 130 can comprise a channel profile, and the first radial edge 180 of the second clamp section 104 can comprise a channel profile and the second radial edge 182 can comprise a protruding profile.

Further, the second sleeve wall 160 has an inner peripheral surface 190, an outer peripheral surface 192, a first end 194, and a second end 196. As shown, the second sleeve wall 160 also includes a plurality of teeth 198 extending in a row, spaced along the outer peripheral surface 192. Here, specifically, the plurality of teeth 198 are shown including a single row of three teeth spaced around the outer peripheral surface 192. However, other arrangements including more or fewer rows and/or more or fewer teeth, including no teeth, are contemplated.

Figure 4:
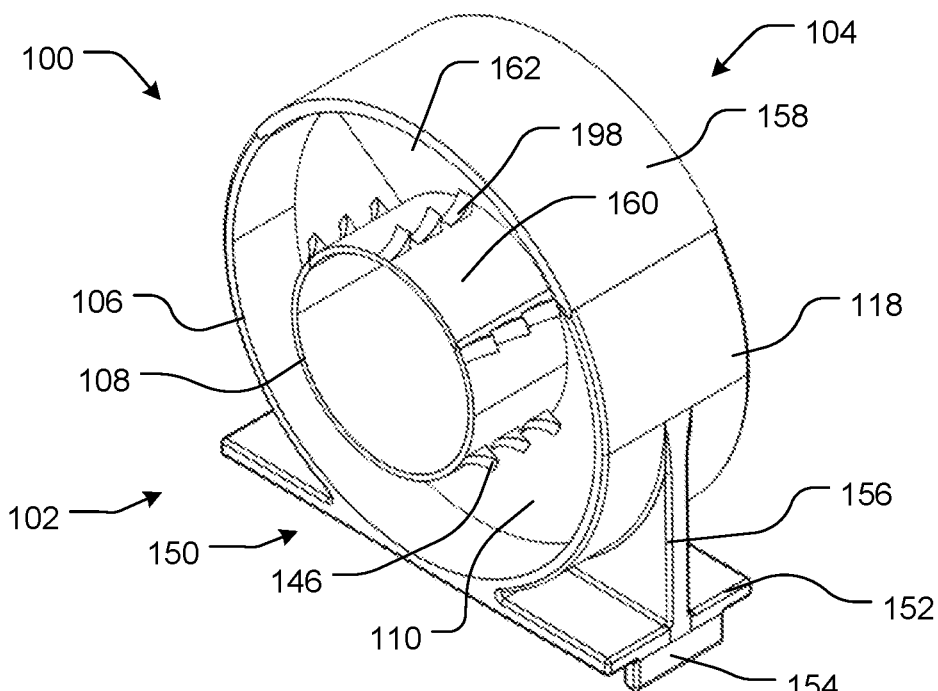
FIG. 4 is a front top right isometric view of the mounting clamp of FIG. 1 in a closed configuration.
Figure 5:
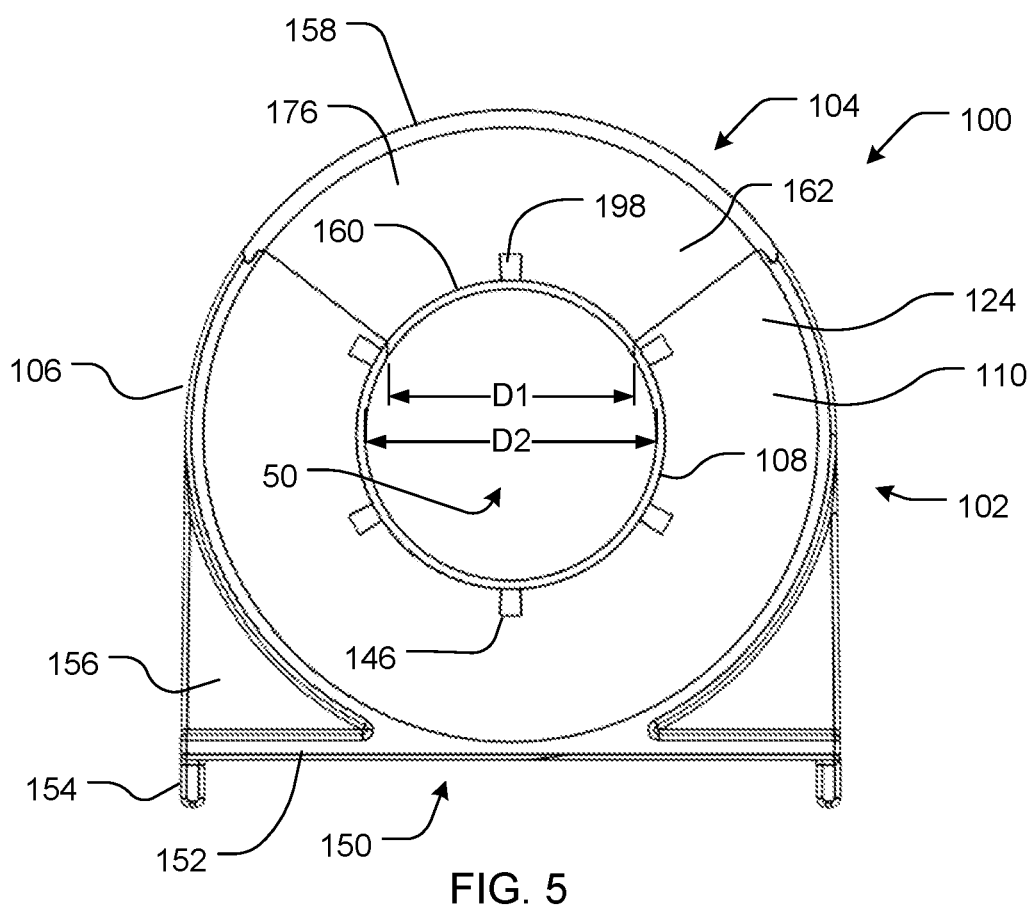
FIG. 5 is a front elevation view of the mounting clamp of FIG. 1 in the closed configuration.
Figure 6:
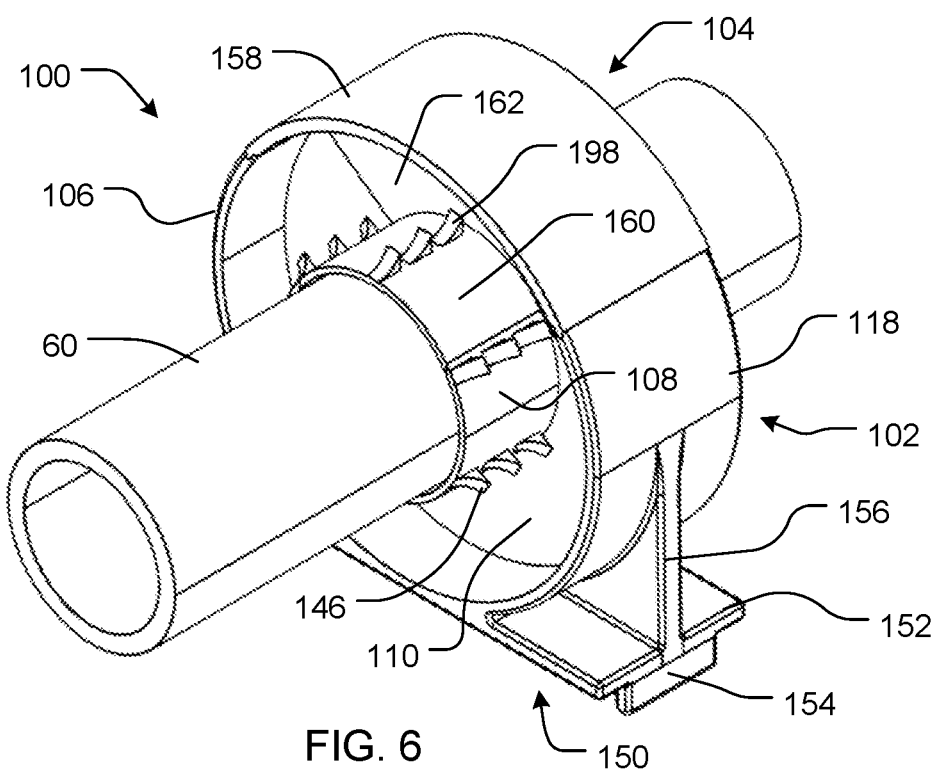
FIG. 6 is a front top right isometric view of the mounting clamp of FIG. 1 in the closed configuration retaining an elongate object therein according to an embodiment of the invention.

FIGS. 4 and 5 show the first clamp section 102 coupled with the second clamp section 104 in a closed configuration. As shown, in the closed configuration the first and second protruding profiles 186, 188 of the second clamp section 104 are removably lockingly received within the first and second channel profiles 134, 136 of the first clamp section 102. As noted above, the first and second protruding profiles 186, 188 of the second clamp section 104 provide engagement profiles that are one half of a snap lock feature and the first and second channel profiles 134, 136 of the first clamp section 102 provided engagement profiles that are the other half of a snap lock feature. However, any workable combination of male and female (or other) snap fit features is contemplated and should not be limited to only what is shown in the figures. Further, the first and second end mating features 120, 122 of the first sleeve wall 106 of the first clamp section 102 are configured to interface with the first and second end mating features 172, 174 of the first sleeve wall 158 of the second clamp section 104 to add stability to the coupling of the first and second clamp sections 102, 144 and provide a visual indicator of proper coupling.

Additionally, the coupling of the first and second clamp sections 102, 104 and placement of the mounting clamp 100 into the closed configuration defines front and rear contact surfaces. The front contact surface is defined by the combination of the front contact surface 124 of the collar wall 110 of the first clamp section 102 and the front contact surface 176 of the collar wall 162 of the second clamp section 104. The rear contact surface is defined by the combination of the rear contact surface 126 of the collar wall 110 of the first clamp section 102 and the rear contact surface 178 of the collar wall 162 of the second clamp section 104. The front and rear contact surfaces provide a continuous, unbroken contact surface against which pipe insulation can abut as shown, for example, in FIG. 10 with respect to the front contact surface (i.e., the combination of front contact surfaces 124, 176).

Moreover, the combination of the first and second clamp sections 102, 104 form an internal passageway 16. The internal passageway 50 is defined by the inner arcuate profiles 132, 184 of the collar walls 110, 162 and the second sleeve walls 108, 160 of the first and second clamp sections 102, 104, respectively. The internal passageway 50 has an internal passageway diameter D2 (shown in FIG. 5).

Figure 7:
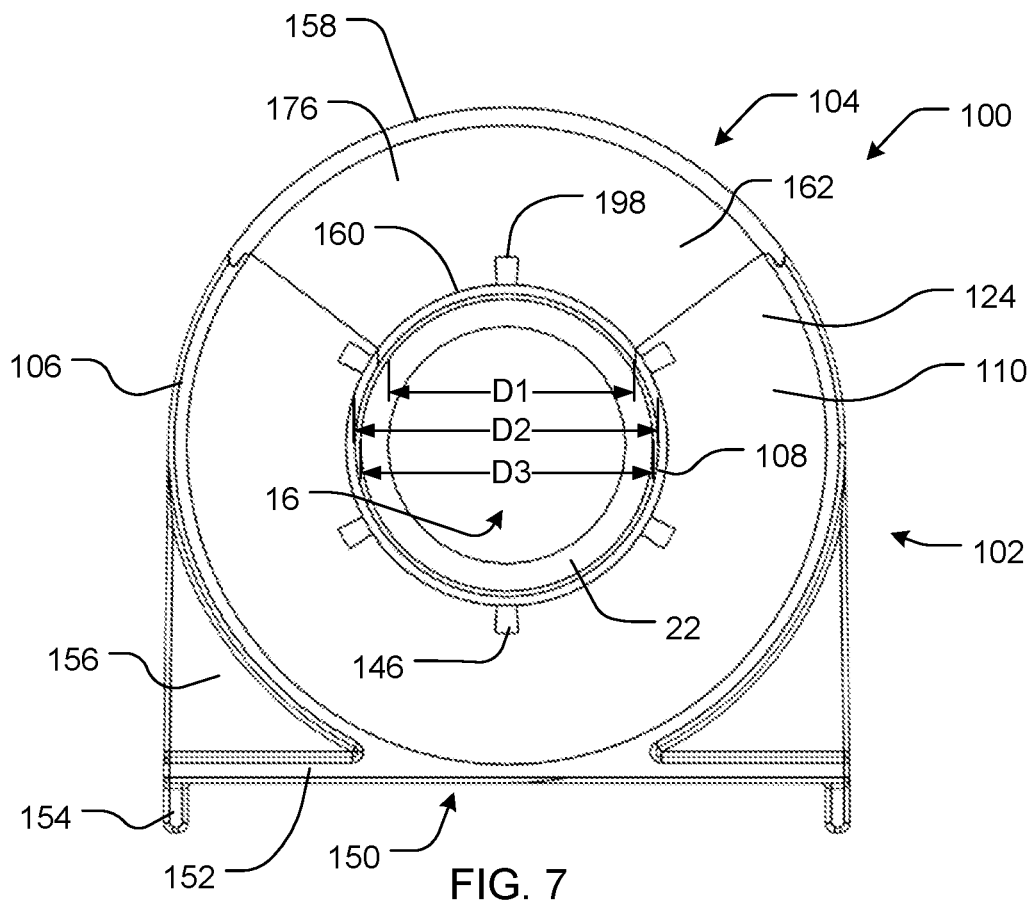
FIG. 7 is a front elevation view of the mounting clamp of FIG. 1 in the closed configuration with the elongate object.

Looking at FIGS. 1 through 10, the inner arcuate profile 132 of the collar wall 110 and the inner sleeve wall 108 of the first clamp section 102 define over 180 degrees of the circumference of the internal passageway 16. As shown in FIGS. 5 and 7, the internal passageway diameter D2 is then longer than the opening distance D1 of the opening 148 in the first clamp section 102. In some configurations, the opening distance D1 of the opening 148 is less than an outer diameter D3 of a pipe 60 (shown in FIG. 7). In installations in which the mounting clamp 100 is mounted in an orientation rotated at least 90 degrees clockwise or counterclockwise about the internal passageway 50 from the orientation shown in FIG. 7, the configuration prevents the pipe 60 from falling out of the first clamp section 102 due to the interference created by the smaller opening distance D1.

In some configurations, the internal passageway diameter D2 can be greater than the outer diameter D3 of the pipe 60. This size difference provides room for thermal expansion of the pipe 60. For example, some pipes (e.g., a copper pipe) can expand and contract depending on the difference in temperatures of the fluid traveling through the pipe and the ambient air outside the pipe. For instance, when installing pipe in a building, the pipe is typically the same temperature as the ambient air at the time of installation. However, when later carrying water with a temperature greater than the ambient air temperature in the building (e.g., water at 140 degrees Fahrenheit in a building with an ambient air temperature of 70 degrees Fahrenheit), the copper pipe can expand lengthwise (e.g., ½" over 100 feet of pipe) due to thermal expansion. Therefore, the size relationship between the internal passageway 50 and the pipe 60 is configured to allow the pipe 60 to slide freely relative to the mounting clamp 100.

Figure 8:
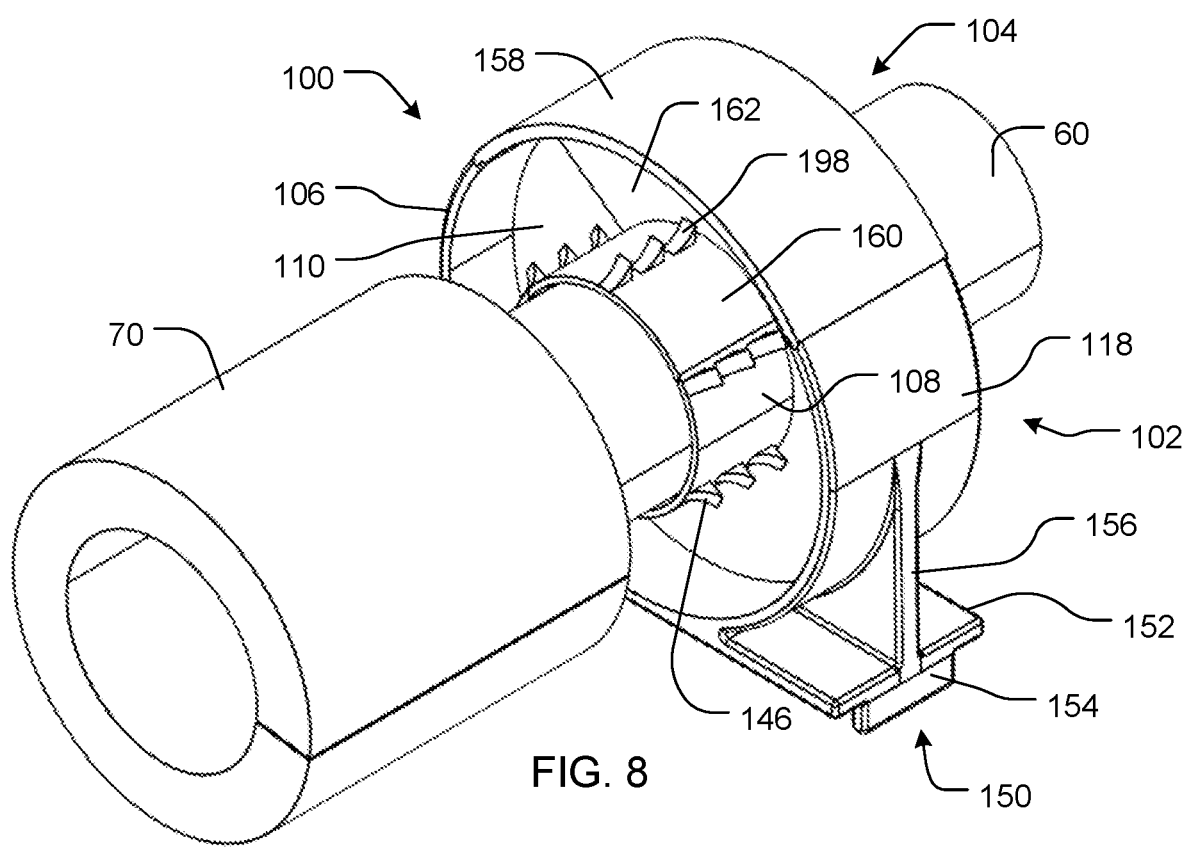
FIG. 8 is a front top right isometric view of the mounting clamp of FIG. 1 with the elongate object therein and pipe insulation positioned around the pipe according to an embodiment of the invention.
Figure 9:
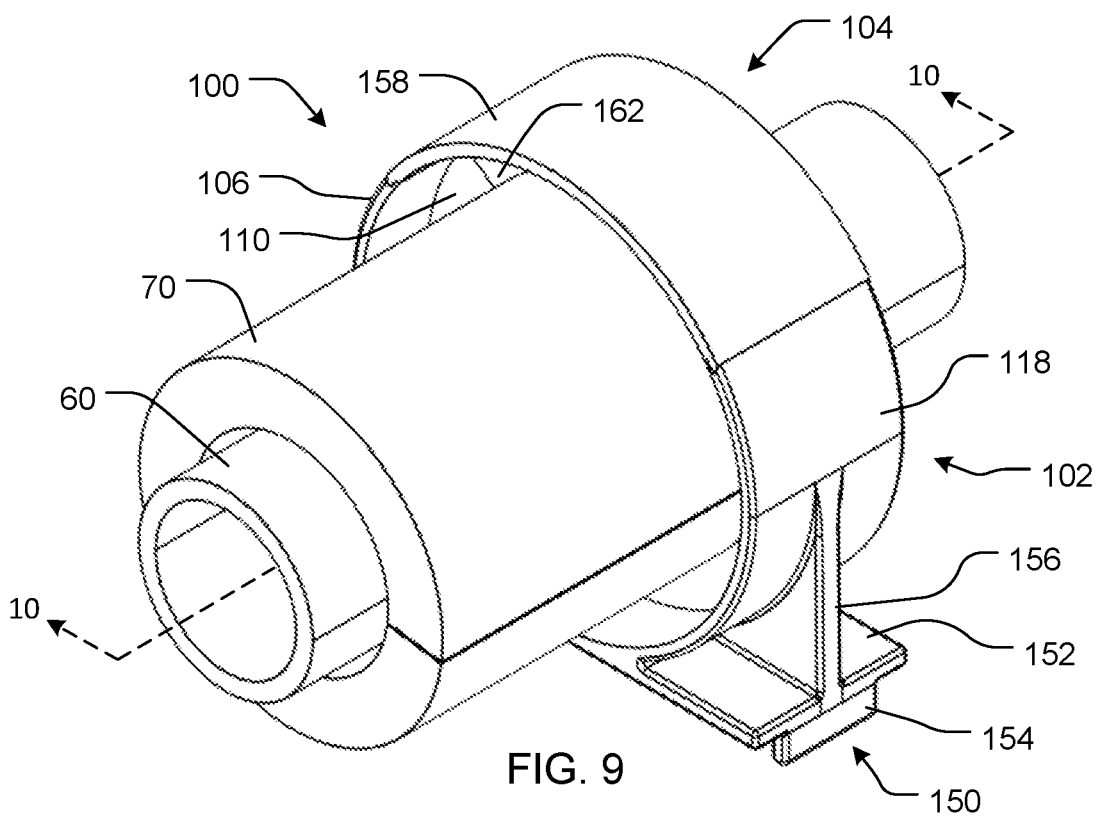
FIG. 9 is a front top right isometric view of the mounting clamp of FIG. 1 with the elongate object therein and the pipe insulation engaged therewith according to an embodiment of the invention.
Figure 10:
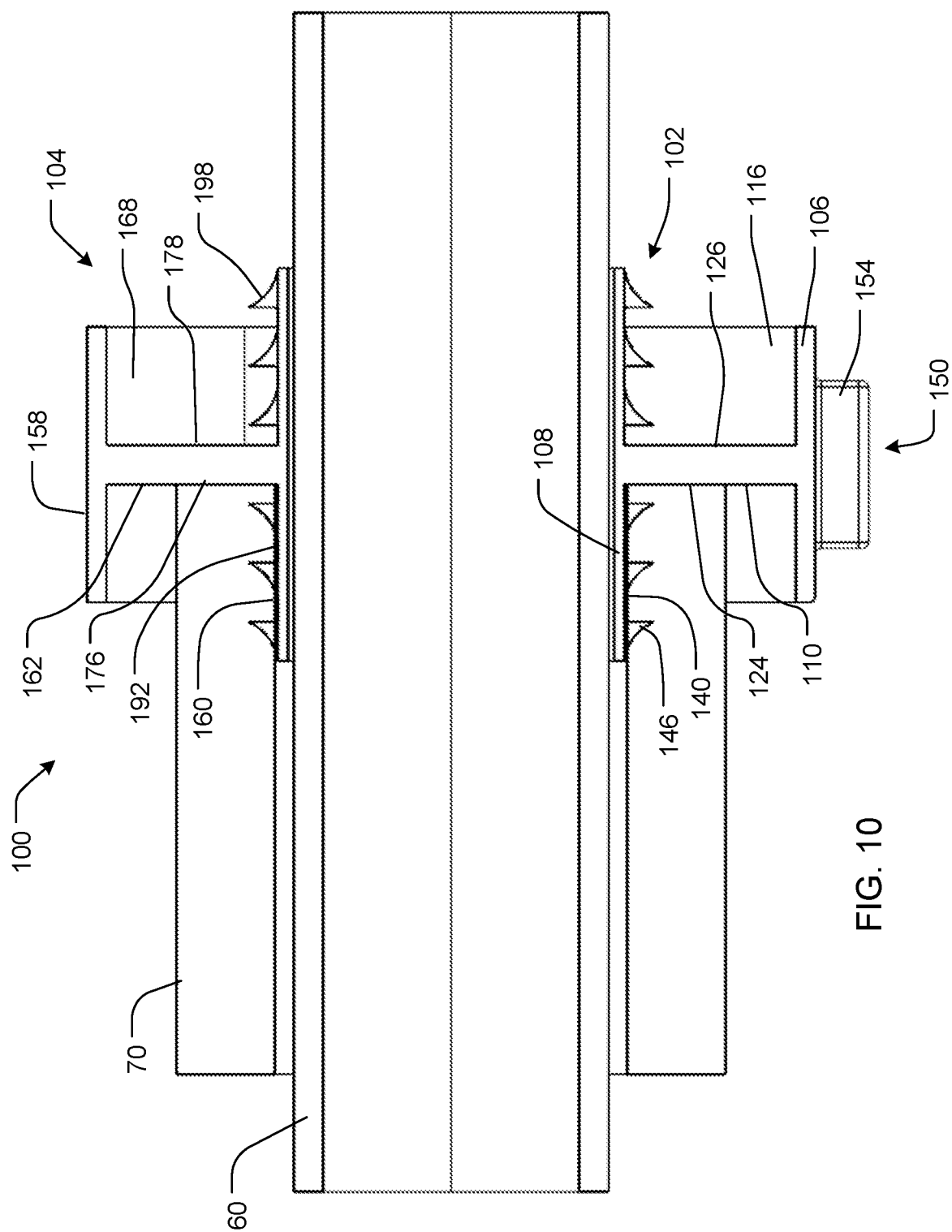
FIG. 10 is a cross-sectional view of the mounting clamp, pipe, and insulation taken along line 10-10 in FIG. 9.

FIGS. 8 through 10 illustrate an embodiment of installing a pipe insulation 70 over the pipe 60 and into engagement with the mounting clamp 100. As shown, the pipe insulation 70 can be fit over the pipe 60 (shown in FIG. 8) and slid into engagement with the mounting clamp 100 (shown in FIG. 9). In the engagement, the second sleeve walls 108, 160 are received within the pipe insulation 70 along with the pipe 60 and the pipe insulation 70 abuts the front contact surfaces 124, 176 of the collar walls 110, 162. The plurality of teeth 146, 198 of the second sleeve walls 108, 160 engage the inner surface of the pipe insulation 70 to maintain the position of the pipe insulation 70 relative to the mounting clamp 100. The engagement of the plurality of teeth 146, 198 also aids in maintaining the position of the pipe insulation 70 when the pipe 60 experiences thermal expansion as discussed above.

Continuing, as shown in FIG. 10, the engagement of the pipe insulation 70 with the mounting clamp 100 based on the relationship with internal surface of the pipe insulation 70 and the plurality of teeth 146, 198 extending from the second sleeve walls 108, 160. The mounting clamp 100 is not dependent upon engagement of the inner peripheral surfaces 116, 168 of the first sleeve walls 106, 158, respectively, with the pipe insulation 70. Therefore, the mounting clamp 100 can be used with various sizes of pipe insulation.

Figure 13:
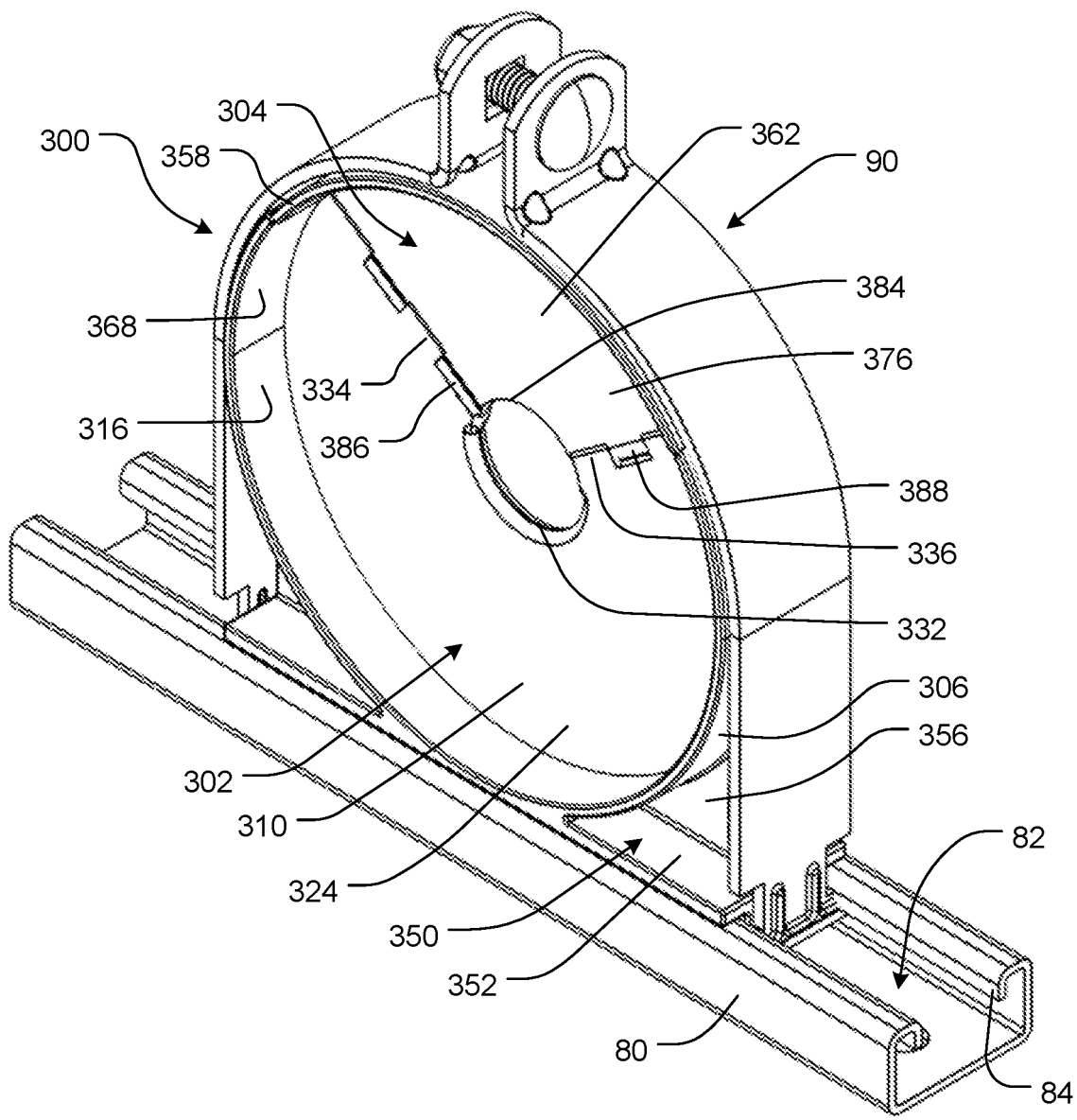
FIG. 13 is a front top right isometric view of the mounting clamp of FIG. 12 in a closed configuration secured to a strut channel with a strut clamp according to an embodiment of the invention.

It is further contemplated that the outer peripheral surfaces 118, 170 of the combined first and second clamp sections 102, 104 are sized and configured to be received within a strut clamp (for example, a strut clamp 90 as shown in FIG. 13) that can be installed in a strut channel (for example, the strut channel 80 shown in FIG. 13) and tightened over the mounting clamp 100 to be removably coupled thereto.

Figure 11:
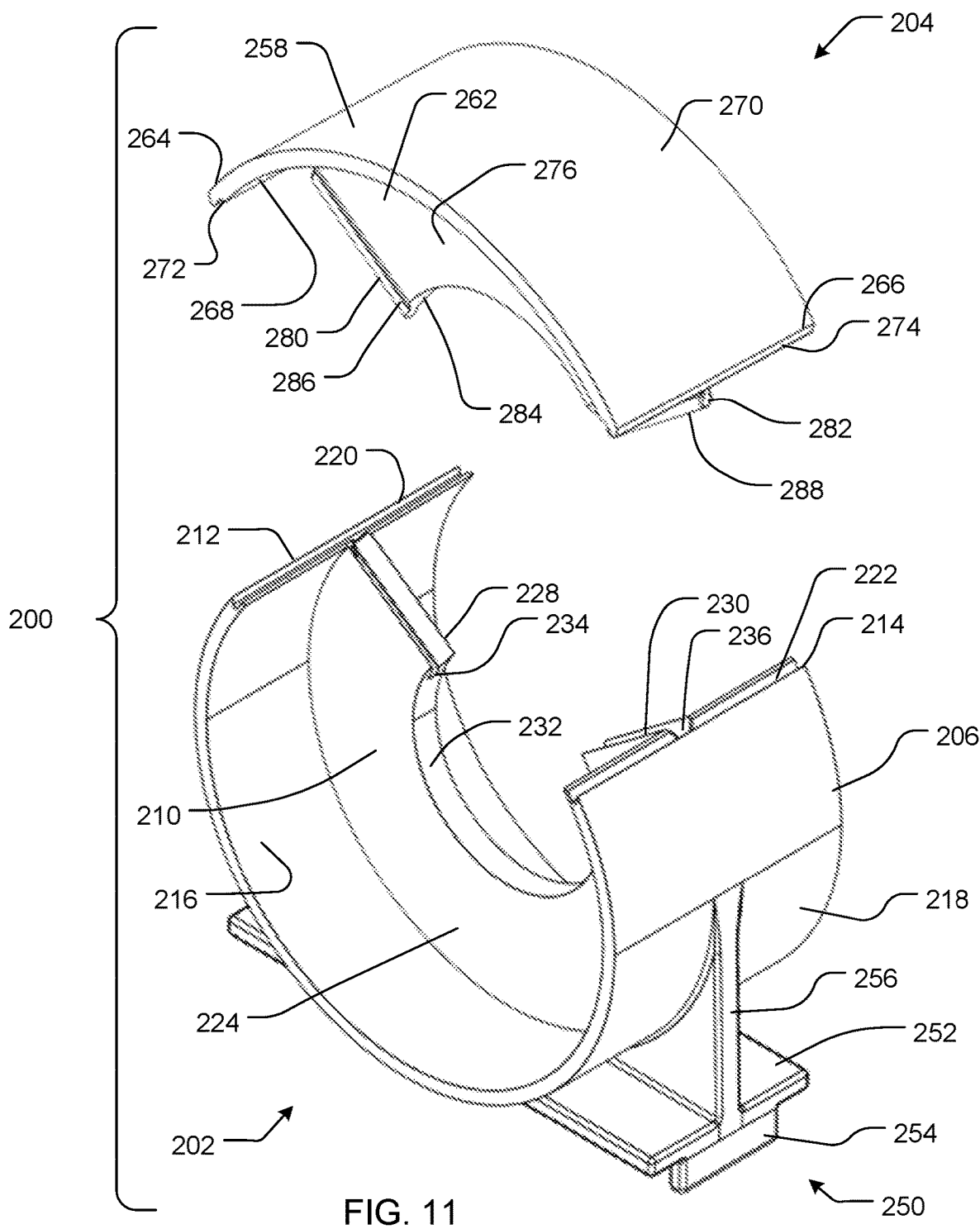
FIG. 11 is a front top right isometric view of a mounting clamp in an open configuration according to another embodiment of the invention.

FIG. 11 illustrates another embodiment of a mounting clamp 200 according to the invention, as also can be mounted to a strut channel (for example, the strut channel 80 shown in FIG. 13) and receive an elongate object (for example, the pipe 60 shown in FIGS. 6 through 10). In many aspects, the mounting clamp 200 is similar to the mounting clamp 100 described above and similar numbering in the 200 series is used for the mounting clamp 200. For example, the mounting clamp 200 has a first clamp section 202 with a sleeve wall 206, a collar wall 210, a base 250, and a set of gussets 256. The sleeve wall 206 includes a first end 212 with a first end mating feature 220, a second end 214 with a second end mating feature 222, an inner peripheral surface 216, and an outer peripheral surface 218. The collar wall 210 includes a front contact surface 224, a rear contact surface (hidden), an arcuate inner surface 232, a first radial edge 228 with an engagement profile that is a first channel profile 234 extending along the first radial edge 228, and a second radial edge 230 with an engagement profile that is a second channel profile 236 extending along the second radial edge 230. The base 250 includes a platform 252 and a set of feet 254.

Further, the mounting clamp 200 has a second clamp section 204 with a sleeve wall 258 and a collar wall 262. The sleeve wall 258 includes a first end 264 with a first end mating feature 272, a second end 266 with a second end mating feature 274, an inner peripheral surface 268, and an outer peripheral surface 270. The collar wall 262 includes a front contact surface 276, a rear contact surface (hidden), an inner arcuate profile 284, a first radial edge 280 with an engagement profile comprising a first protruding profile 286 extending along the first radial edge 280 and configured to be received within the first channel profile 234 of the first clamp section 202, and a second radial edge 282 with an engagement profile comprising a second protruding profile 288 extending along the second radial edge 282 and configured to be received within the second channel profile 236 of the second clamp section 202.

Additionally, the first and second clamp sections 202, 204 are also removably combinable to form an internal passageway (not shown) in which the pipe 60 can be received similar to the first and second clamp sections 102, 104 of the mounting clamp 100.

In some aspects, however, the mounting clamps 100, 200 differ from each other. For example, the first and second clamp sections 202, 204 do not include the second, or inner, sleeve walls extending from the respective collar walls 210, 262.

FIGS. 12 and 13 illustrate another embodiment of a mounting clamp 300 according to the invention, as also can be mounted to a strut channel (for example, the strut channel 80 shown in FIG. 13) and receive an elongate object (for example, the pipe 60 shown in FIGS. 6 through 10). In many aspects, the mounting clamp 300 is similar to the mounting clamp 200 described above and similar numbering in the 300 series is used for the mounting clamp 300. For example, the mounting clamp 300 has a first clamp section 302 with a sleeve wall 306, a collar wall 310, a base 350, and a set of gussets 356. The sleeve wall 306 includes a first (circumferential) end 312 with a first end mating feature 320, a second (circumferential) end 314 with a second end mating feature 322, an inner peripheral surface 316, and an outer peripheral surface 318. The collar wall 310 includes a front contact surface 324, a rear contact surface (hidden), an arcuate inner surface 332, and a first radial edge 328 and a second radial edge 330 defining a first engagement profile. Additionally, the base 350 includes a platform 352 and a set of feet 354.

Further, the mounting clamp 300 has a second clamp section 304 with a sleeve wall 358 and a collar wall 362. The sleeve wall 358 includes a first end 364 with a first end mating feature 372, a second end 366 with a second end mating feature 374, an inner peripheral surface 368, and an outer peripheral surface 370. The collar wall 362 includes a front contact surface 376, a rear contact surface (hidden), an inner arcuate profile 384, and a first radial edge 380 and a second radial edge 382 defining a second engagement profile comprising first and second protruding profiles 386, 388, respectively.

Additionally, the first and second clamp sections 302, 304 are also removably combinable to form an internal passageway (not shown) in which the pipe 60 can be received, similar to the first and second clamp sections 202, 204 of the mounting clamp 200.

In some aspects, however, the mounting clamps 200, 300 differ from each other. For example, the first engagement profile of the first clamp section 302 is formed by a plurality of tabs including a first tab 334 extending circumferentially from the first radial edge 328 and a second tab 336 extending circumferentially from the second radial edge 330 of the collar wall 310. As shown, the channel profile along the first radial edge 328 includes a plurality of first tabs 334 opposingly and alternatingly spaced along the first radial edge 328 and the channel profile along the second radial edge 330 includes a plurality of second tabs 336 opposingly and alternatingly spaced along the second radial edge 330. In some embodiments, at least one set of first tabs of the plurality of first tabs 334 can be arranged directly opposed to each other on the first radial edge 328. Similarly, in some embodiments, at least one set of the second tabs of the plurality of second tabs 336 can be arranged directly opposingly on the second radial edge 330 330.

Continuing, the plurality of first tabs 334 collectively define a recessed channel along the first radial edge 328 configured to receive the first protruding profile 386 of the first radial edge 380 of the second clamp section 304. The plurality of second tabs 336 collectively define a recessed channel configured to receive the second protruding profile 388 of the second radial edge 382 of the second clamp section 304.

It is further contemplated that in some embodiments, the first and second engagement profiles can comprise combinations of engagement profiles. For example, the first engagement profile can be formed by one or more first protrusions that extend circumferentially from the collar wall 310 of the first clamp section 302. Similarly, the second engagement profile can be formed by one or more second protrusions that extend circumferentially from the collar wall 362 of the second clamp section 304 and are configured for snap-fit engagement with the one or more first protrusions.

Additionally, the base 350 further includes a set of locking tabs extending downward therefrom, opposite the direction of the first clamp section 302. In some embodiments, such as, for example, the mounting clamp 300 shown in FIG. 12, a first locking tab 390 of the set of locking tabs is positioned at one corner of the base 350 and a second locking tab (hidden) can be positioned at another corner, opposite the first locking tab 390 and facing in an opposite direction (e.g., so that the tabs are arranged to engage a strut on opposing sides of a strut channel). In some embodiments, the set of locking tabs can include a third locking tab and a fourth locking tab, with each locking tab positioned at a respective corner of the base 350. The set of locking tabs, including the first locking tab 390 and the second locking tab (hidden), are each configured to engage a reentrant lip 84 of the strut channel 80 (e.g., the first locking tab 390 engages one of the two reentrant lips and the second locking tab (hidden) engages the other reentrant lip) to at least temporarily secure the mounting clamp 300 thereto, as shown in FIG. 13, before, during, or after a strut clamp 90 is installed.

Figure 14:
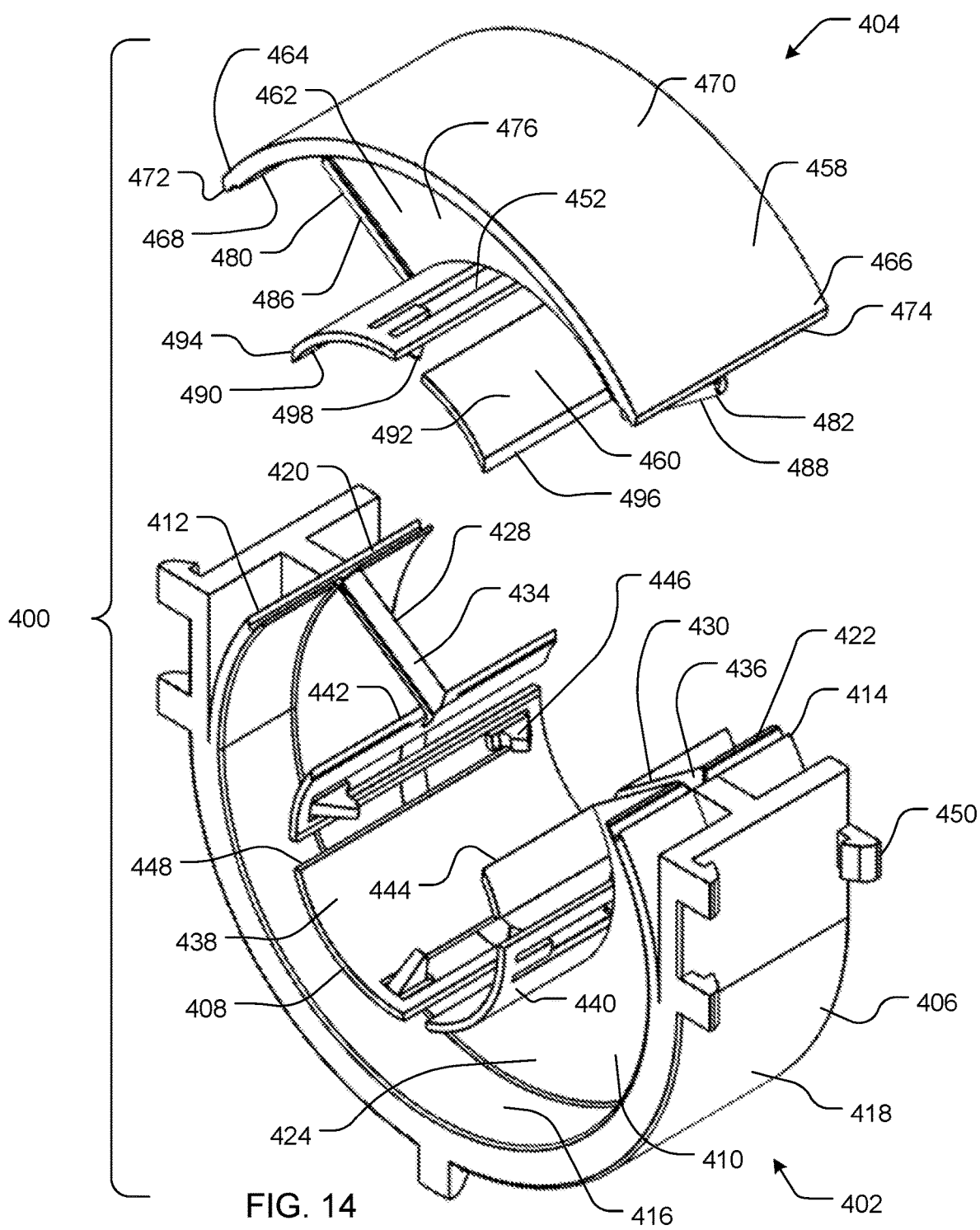
FIG. 14 is a front top right isometric view of a mounting clamp in an open configuration according to another embodiment of the invention.
Figure 15:
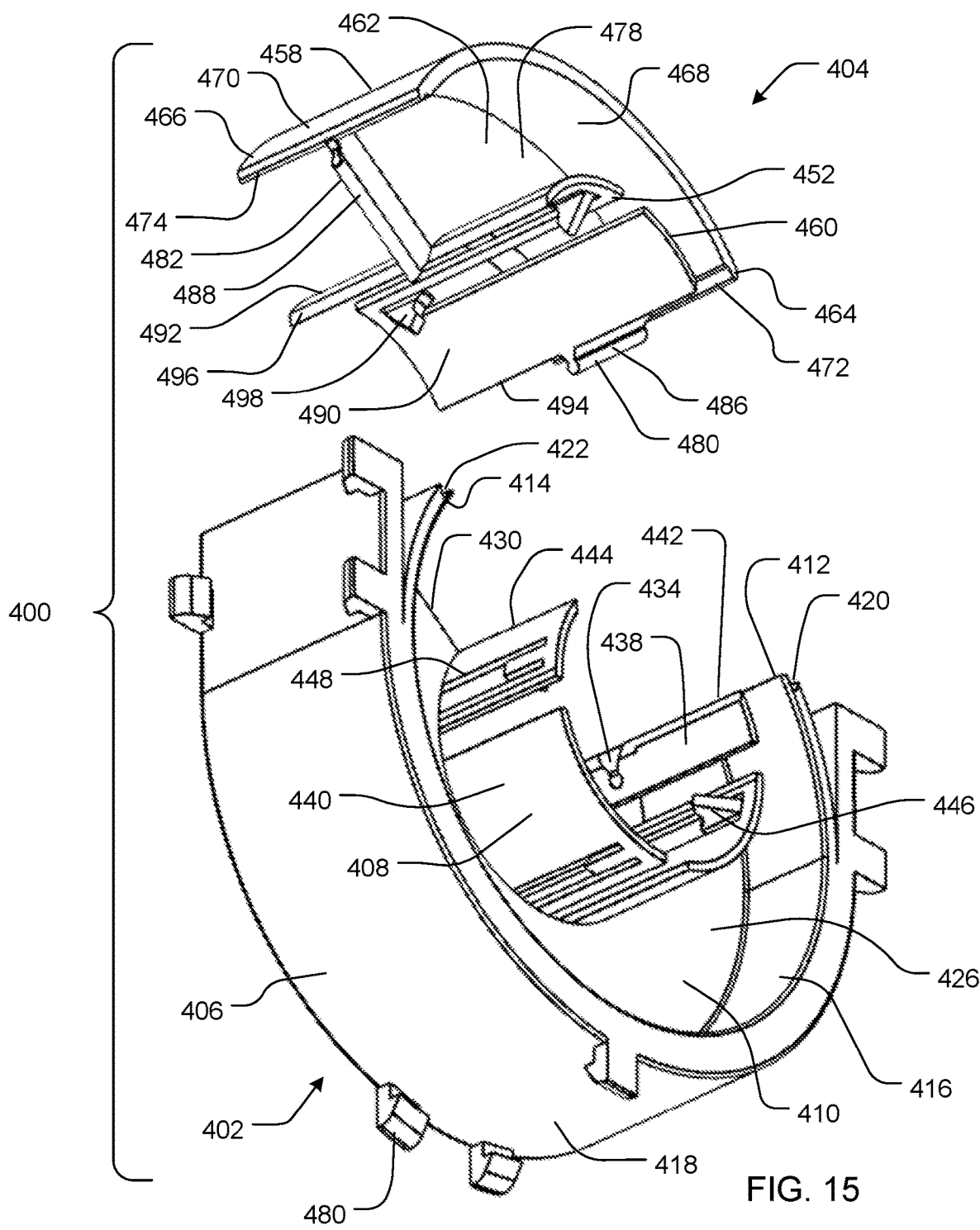
FIG. 15 is a rear bottom right isometric view of the mounting clamp of FIG. 14 in the open configuration.

FIGS. 14 and 15 illustrate another embodiment of a mounting clamp 400 according to the invention, as also can receive a pipe (for example, the pipe 60 shown in FIGS. 6 through 10). In many aspects, the mounting clamp 400 is similar to the mounting clamp 100 described above and similar numbering in the 400 series is used for the mounting clamp 400. For example, the mounting clamp 400 has a first clamp section 402 with a first sleeve wall 406, a second sleeve wall 408, and a collar wall 410. The first sleeve wall 406 includes a first end 412 with a first end mating feature 420, a second end 414 with a second end mating feature 422, an inner peripheral surface 416, and an outer peripheral surface 418. The second sleeve wall 408 includes a first end 442, a second end 444, an inner peripheral surface 438, and an outer peripheral surface 440. The collar wall 410 includes a front contact surface 424, a rear contact surface 426, and a first radial edge 428 and a second radial edge 430 defining a first engagement profile comprising first and second channel profiles 434, 436, respectively.

Further, the mounting clamp 400 has a second clamp section 404 with a first sleeve wall 458, a second sleeve wall 460, and a collar wall 462. The first sleeve wall 458 includes a first end 464 with a first end mating feature 472, a second end 466 with a second end mating feature 474, an inner peripheral surface 468, and an outer peripheral surface 470. The second sleeve wall 460 includes a first end 494, a second end 496, an inner peripheral surface 490, and an outer peripheral surface 492. The collar wall 462 includes a front contact surface 476, a rear contact surface 478, a first radial edge 480 and a second radial edge 482 defining a second engagement profile comprising first and second protruding profiles 486, 488, respectively.

Additionally, the first and second clamp sections 402, 404 are also removably combinable to form an internal passageway (not shown) in which an elongate object (for example, the pipe 60 shown in FIGS. 6 through 10) can be received similar to the first and second clamp sections 102, 104 of the mounting clamp 100.

In some aspects, however, the mounting clamps 100, 400 differ from each other. For example, the second sleeve walls 408, 460 of the first and second clamp sections 402, 404 include barbs 446, 498 and slots 448, 452, respectively. The barbs 446, 498 are movable between a neutral configuration and an engaged configuration. For example, in the neutral configuration, the barbs 446, 498 are facing and positioned inwardly into the internal passageway and can be urged outwardly toward the first sleeve walls 406, 458 and into the engaged configuration when the pipe 60 is received within the respective second sleeve wall 408, 460. In the engaged configuration, the barbs 446, 498 are in position to engage with pipe insulation (for example, the pipe insulation 70 shown in FIGS. 8 through 10). In some configurations, the barbs 446, 498 can be movable between the neutral configuration and the engaged configuration with a living hinge as shown in FIGS. 14 and 15. The slots 448, 452, are configured to enhance the flexibility within the respective second sleeve walls 408, 460 when the pipe 60 is received therein.

Additionally, the mounting clamp 400 includes clasps 450 extending radially outward from the outer peripheral surface 440 of the first sleeve wall 406 of the first clamp section 402. The clasps 450 are configured to be removably engageable with a saddle clevis hanger (not shown) to support and removably secure the first clamp section 402 therein.

Figure 16:
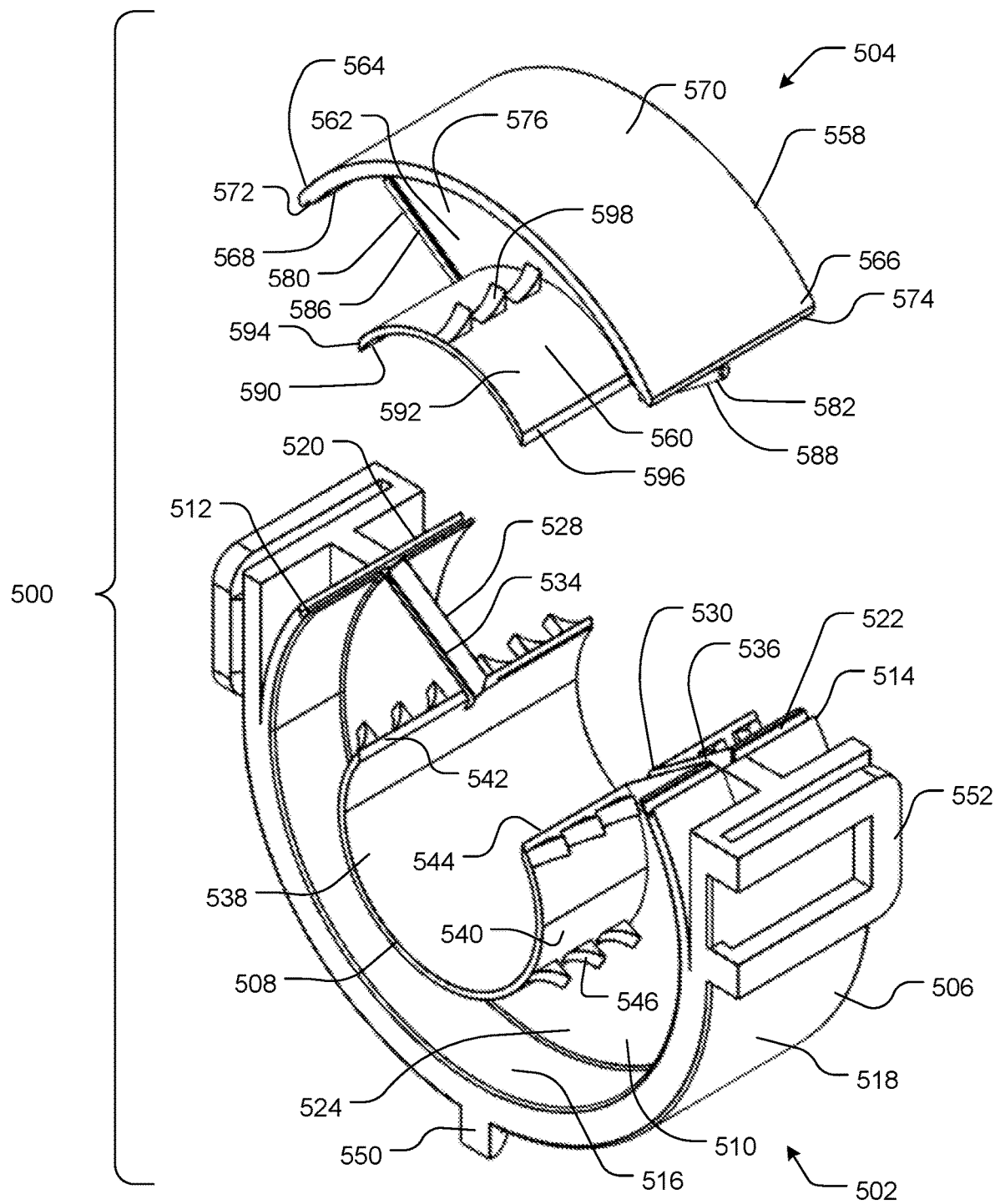
FIG. 16 is a front top right isometric view of a mounting clamp in an open configuration according to another embodiment of the invention.

FIG. 16 illustrates another embodiment of a mounting clamp 500 according to the invention, as also can receive an elongate object (for example, the pipe 60 shown in FIGS. 6 through 10). In many aspects, the mounting clamp 500 is similar to a combination of the mounting clamp 100 and the mounting clamp 400 described above and similar numbering in the 500 series is used for the mounting clamp 500. For example, the mounting clamp 500 has a first clamp section 502 with a first sleeve wall 506, a second sleeve wall 508, and a collar wall 510. The first sleeve wall 506 includes a first end 512 with a first end mating feature 520, a second end 514 with a second end mating feature 522, an inner peripheral surface 516, and an outer peripheral surface 518. The second sleeve wall 508 includes a first end 542, a second end 544, an inner peripheral surface 538, an outer peripheral surface 540, and teeth 546 extending radially outward from the outer peripheral surface 540. The collar wall 510 includes a front contact surface 524, a rear contact surface (hidden), a first radial edge 528 and a second radial edge 530 defining a first engagement profile comprising first and second channel profiles 534, 536, respectively.

Further, the mounting clamp 500 has a second clamp section 504 with a first sleeve wall 558, a second sleeve wall 560, and a collar wall 562. The first sleeve wall 458 includes a first end 564 with a first end mating feature 572, a second end 566 with a second end mating feature 574, an inner peripheral surface 568, and an outer peripheral surface 570. The second sleeve wall 560 includes a first end 594, a second end 596, an inner peripheral surface 590, an outer peripheral surface 592, and teeth 598 extending radially outward from the outer peripheral surface 592. The collar wall 562 includes a front contact surface 576, a rear contact surface (hidden), a first radial edge 580 and a second radial edge 582 defining a second engagement profile comprising first and second protruding profiles 586, 588, respectively.

Additionally, the first and second clamp sections 502, 504 are also removably combinable to form an internal passageway (not shown) in which the pipe 60 can be received similar to the first and second clamp sections 102, 104 of the mounting clamp 100.

In some aspects, however, the mounting clamp 500 differs from the mounting clamps 100, 400. For example, although the mounting clamp 500 includes clasps 550 extending radially outward from the outer peripheral surface 540 at the bottom of the first sleeve wall 506 of the first clamp section 502 (as viewed in the orientation shown in FIG. 16), the mounting clamp 500 also has a set of clips 552 extending from the outer peripheral surface 540 adjacent the first end 512 and the second 514 of the first sleeve 506. The clips 552 are configured to be removably engageable with a saddle clevis hanger (not shown) to support and removably secure the first clamp section 502 therein. For example, open ends of the clips 552 can be positioned adjacent the saddle clevis, whereby the first clamp section 502 is oriented obliquely relative to the saddle clevis. The first clamp section 502 can then be rotated relative to the saddle clevis, so that the sides of the saddle clevis are received within the clips 552 and thereby securing the first clamp section 502 to the saddle clevis.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

For example, with reference to FIGS. 1 through 9, some embodiments can include an installation method under which a user can install a pipe 60 in the mounting clamp 100 and install pipe insulation 70 over the pipe 60 and into engagement with the mounting clamp 100. The method can include, with the mounting clamp 100 in an open configuration (shown in FIGS. 1 through 3), placing the mounting clamp 100 in a closed configuration (shown in FIGS. 4 and 5) by urging the first and second clamp sections 102, 104 toward each other and interconnecting the first and second channel profiles 134, 136 on the collar wall 110 of the first clamp section 102 with the first and second protruding profiles 186, 188 on the collar wall 162 of the second clamp section 104, forming an internal passageway 50 between the collar walls 110, 162. The method further includes inserting the pipe 60 through the internal passageway 50 and installing a pipe insulation 70 around the pipe 90. The pipe insulation 70 is then translated along the pipe 60 and into engagement with the mounting clamp 100.

Some embodiments of the method can further include receiving sleeve walls 108, 160 extending from the collar walls 110, 162 into the pipe insulation 70. Some embodiments of the method can include engaging teeth 146, 198 extending radially outward from the sleeve walls 108, 160 with the pipe insulation 70. Some embodiments of the method can include first receiving the pipe 60 within the first clamp section 102 prior to urging the first and second clamp sections 102, 104 together (i.e., while the mounting clamp 100 is in the open configuration).

As used herein, unless otherwise define or limited, "radial" directions extend perpendicularly to a reference axial direction. For example, with reference to an elongate pipe or conduit section that defines an axial direction corresponding to a center (or centroid) axis of the pipe or conduit, a corresponding radial direction extends perpendicularly to the center axis in any angular direction around a full 360 degree range centered on the axis. Similarly, unless otherwise defined or limited herein, "circumferential" directions extend along a reference circle of any radius that is centered along a reference axial direction. For example, again with reference to an elongate pipe or conduit section that defines an axial direction corresponding to a center (or centroid) axis of the pipe or conduit, a corresponding circumferential direction extends locally tangentially to a circle of any radius that is centered on the center axis.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A support clamp for supporting an elongate object that extends along an axial direction, the support clamp comprising:
   a clamp body that forms a cylindrical sleeve, and a collar that extends radially inwardly from the cylindrical sleeve to provide an internal passageway sized to receive the elongate object;
   the clamp body including first and second clamp sections each having, respectively:
      a sleeve wall that forms part of the cylindrical sleeve; and
      a collar wall that forms part of the collar and includes an edge that extends radially between the sleeve wall and the internal passage;
      an edge of the first clamp section including a channel profile, the channel profile being formed by a plurality of tabs that extend circumferentially from the edge of the collar wall of the first clamp section;
      an edge of the second clamp section including a protruding profile; and
      the protruding profile being received into the channel profile to removably secure the first and second clamp sections together.

2. The support clamp of claim 1, further comprising:
   clasps extending radially outward from an outer peripheral surface of the first clamp section, the clasps being engageable with a saddle clevis hanger to support and removably secure the first clamp section therein.

3. A support clamp for supporting an elongate object that extends along an axial direction, the support clamp comprising:
   a set of clamp sections, including a first clamp section and a second clamp section;
   a base that extends from the first clamp section, the base including feet sized to fit within an opening of a strut channel to support the support clamp on a strut, and locking tabs configured to resiliently engage reentrant lips of the strut channel;
   the first and second clamp sections each having, respectively:
      a sleeve wall that defines an inner peripheral surface; and
      a collar wall that extends from the inner peripheral surface of the sleeve wall to define: an inner arcuate profile, opposing contact surfaces extending between the inner peripheral surface and the inner arcuate profile, and an edge that extends between the inner peripheral surface and the inner arcuate profile;
      an edge of the first clamp section including a first engagement profile;
      an edge of the second clamp section including a second engagement profile; and
      the first engagement profile engaging the second engagement profile to removably secure the first and second clamp sections together with the inner arcuate profiles defining an internal passageway to receive the elongate object.

4. The support clamp of claim 3, wherein the first engagement profile is defined by first tabs that protrude from the collar wall to engage the second engagement profile.

5. The support clamp of claim 4, wherein the first tabs collectively define a recessed channel configured to receive the second engagement profile.

6. The support clamp of claim 5, wherein the second engagement profile is defined by a second tab that extends along at least a majority of a radial distance between the inner peripheral surface and the inner arcuate profile.

7. The support clamp of claim 3, wherein the first engagement profile is formed by one or more first protrusions that extend circumferentially from the collar wall of the first clamp section and the second engagement profile is formed by one or more second protrusions that extend circumferentially from the collar wall of the second clamp section and are configured for snap-fit engagement with the one or more first protrusions.

8. The support clamp of claim 3, wherein another edge of the first clamp section that extends along the collar wall, between the inner peripheral surface and the inner arcuate profile, includes a third engagement profile;
   wherein another edge of the second clamp section that extends along the collar wall, between the inner peripheral surface and the inner arcuate profile, includes a fourth engagement profile; and
   wherein the third engagement profile engages the fourth engagement profile to further removably secure the first and second clamp sections together.

9. The support clamp of claim 3, wherein the inner arcuate profile of one of the first or second clamp sections extends to define the internal passageway over a range of more than 180 degrees.

10. The support clamp of claim 9, wherein the inner arcuate profile of the one of the first or second clamp sections extends to define the internal passageway over a range of 240 degrees or more.

11. The support clamp of claim 3, wherein the collar wall of one of the first or second clamp sections extends continuously around the internal passageway, between the inner peripheral wall and the inner arcuate profile, over a range of more than 180 degrees.

12. The support clamp of claim 11, wherein the collar wall of the one of the first or second clamp sections extends continuously around the internal passageway, between the inner peripheral wall and the inner arcuate profile, over a range of 240 degrees or more.

13. The support clamp of claim 3, wherein the inner arcuate profile of the first clamp section defines an opening distance between circumferential ends of the collar wall that is smaller than an internal diameter of the internal passageway.

14. The support clamp of claim 3, wherein the sleeve walls are outer sleeve walls; and
wherein each of the first and second clamp sections further includes an inner sleeve wall extending from the inner arcuate profiles of the collar walls, coaxially with the outer sleeve wall, to axially extend the internal passageway;
wherein the inner sleeve walls are configured to be received within a pipe insulation sleeve.

15. The support clamp of claim 14, wherein the inner sleeve walls include teeth extending radially outward from outer peripheral surfaces thereof to engage with the pipe insulation sleeve.

16. A method of installing a pipe, the method comprising:
securing a pipe within an internal passageway of a clamp body that is formed from first and second clamp sections, with the clamp body in a closed configuration, so that that pipe is:
surrounded by a cylindrical sleeve that is formed by a respective sleeve wall of each of the first and second clamp sections; and
supported by a collar that is formed by a respective collar wall of each of the first and second clamp sections and extends radially from the cylindrical sleeve to provide the internal passageway;
wherein placing the clamp body in the closed configuration includes removably securing the first and second clamp sections together with a protruding profile along the collar wall of the first clamp section received within a channel profile along the collar wall of the second clamp section, and
wherein securing the pipe includes:
sliding the pipe into the internal passageway after the clamp body is in the closed configuration, the pipe being surrounded by a pipe insulation sleeve; and
axially translating the pipe insulation sleeve to abut the collar.

17. The method of claim 16, further comprising:
inserting a base that extends from the first clamp section into an opening of a strut channel, including resiliently engaging locking tabs on the base with reentrant lips of the strut channel.

* * * * *